April 25, 1967  J. B. FORTNER ET AL  3,315,541

GEAR ORIENTING DEVICE

Filed July 29, 1964

INVENTORS
JOSEPH B. FORTNER
JOSEPH L. OLIVER
BY Richard W. Treverton
ATTORNEY

United States Patent Office 3,315,541
Patented Apr. 25, 1967

3,315,541
GEAR ORIENTING DEVICE
Joseph B. Fortner and Joseph L. Oliver, Rochester, N.Y., assignors to The Gleason Works, Rochester, N.Y., a corporation of New York
Filed July 29, 1964, Ser. No. 386,021
4 Claims. (Cl. 74—660)

The present invention relates to an orienting device for gears carried by a stepwise-advancing gear conveyor. The invention is especially applicable for gears whose tooth slots have been formed in a preceding operation and upon removal from the conveyor are to be so positioned that in a finishing operation appropriate amounts of stock will be removed from opposite sides of the slots.

A device according to the invention has a fixed guide surface substantially parallel to the path of advance of the carrier and guidingly engageable by tips of the gear teeth, a spring guide surface also substantially parallel to the path of advance of the carrier and engageable with the tips of gear teeth substantially opposite, diametrically, to the teeth engaging said fixed guide surface, for pressing the gear against said fixed guide surface as the carrier moves the gear therealong, and an abutment adjacent said fixed guide surface engageable by a gear tooth adjacent said fixed guide surface during a terminal phase of a step of advance of the carrier, to rotate the gear on the carrier.

A typical embodiment of the invention is shown in the accompanying drawings, wherein.

Figure 3:
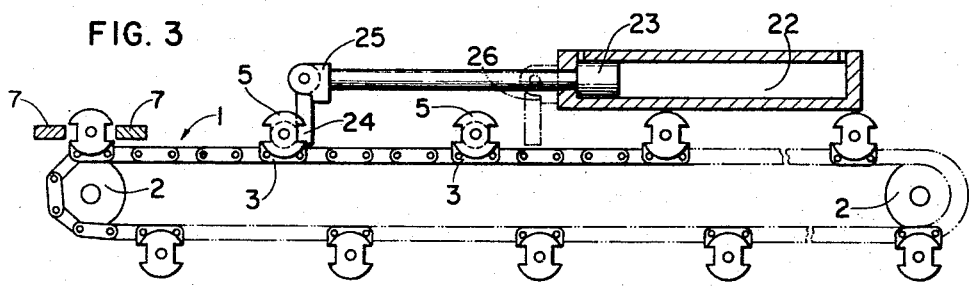

The conveyor may be of the general type disclosed in application Ser. No. 537,243, filed Mar. 24, 1966, a continuation of subsequently abandoned application Ser. No. 356,711, filed Apr. 2, 1964, by William G. Buchanan et al., and be arranged for carrying work gears from one station of a cutting machine, where the tooth slots are rough cut, to a second station at which they are finish cut. The conveyor comprises an endless belt 1 of the pivoted link type, running on suitable guide-support means such as sheaves 2. Chain links 3 spaced equally around the belt are connected by spacers 4 with disc-shaped work gear carriers 5. The carriers have upstanding central pintles 6 which engage loosely in the bores of the gears in a manner which allows the gears limited radial motion and also rotary motion relative to the carriers. Notches in the peripheries of the carriers admit articulated jaws 7 of a loader mechanism associated with the cutting machine. These jaws are lowered and then closed to grip a gear on the carrier 5 at the loading station, and then are elevated to lift the gear from the carrier and place it on the work spindle of the machine, where its tooth slots are finish cut, all substantially as disclosed in aforementioned application Ser. No. 356,711. The loader mechanism associated with the jaws preferably is arranged to interfit in tooth slots of the work gears, and, by such interfitting, to finely orient the gears for finish cutting. The present invention orients the gears to enable the loader mechanism to engage the gears in this interfitting relationship.

The carriers 5 are slidable on plane horizontal guides 8 which are spaced apart to define a guide slot 9 for the spacers 4. Flanges 11 depending from the guides 8, and cross-members 12 connecting these flanges, define a box-like housing and guide structure for the conveyor chain. The sheaves 2 are supported for rotation by this housing.

Figure 1:
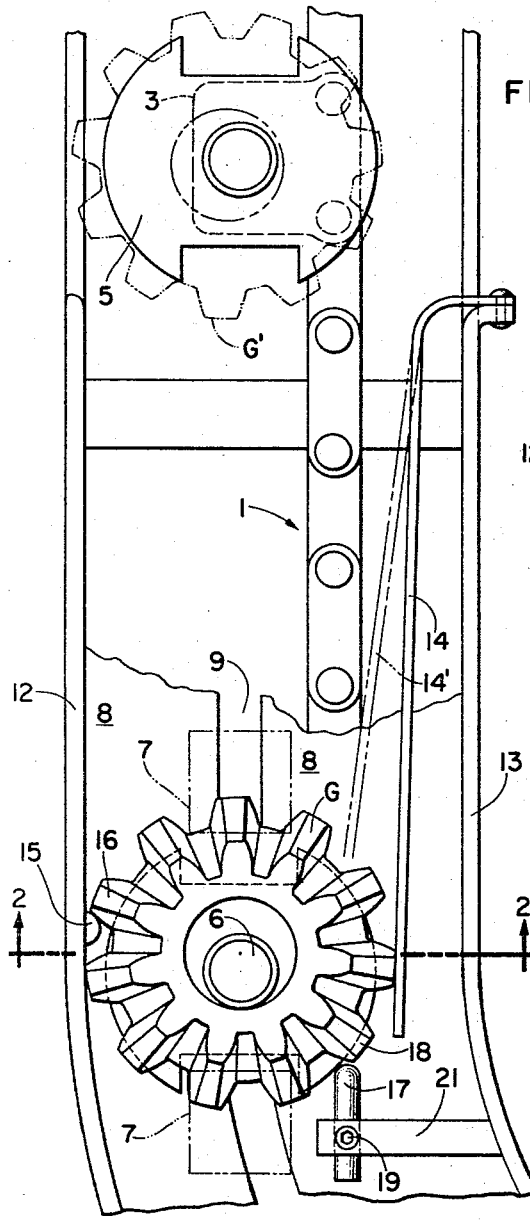
FIG. 1 is a plan view of a section of the conveyor, with the orienting device thereon.
Figure 2:
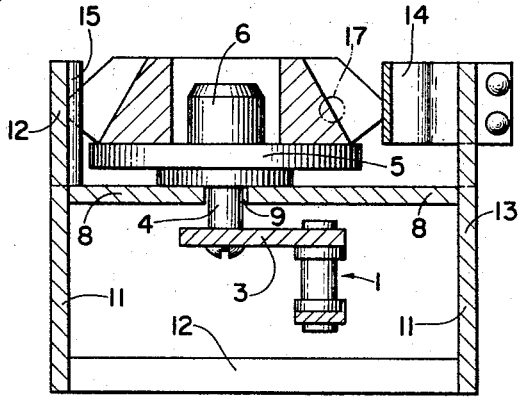
FIG. 2 is a transverse vertical section, approximately in the plane designated 2—2 in FIG. 1; and, FIG. 3 is a fragmentary plan view illustrating actuating means for the conveyor.

Adjacent the loading station, at which the gear G appears in full lines in FIG. 1, the housing has upstanding flanges 12 and 13, substantially parallel to slot 9. A leaf spring 14 secured to flange 13 presents to a gear traveling from broken-line position G' to full-line position G in FIG. 1 a spring guide surface which is substantially parallel to flange 12. During at least the latter part of such travel, this spring guide surface presses the gear against the fixed guide surface constituted by flange 12. The spring is shown at 14' in broken lines in its unflexed condition. Adjacent the fixed guide surface, there is an abutment 15 consisting of a vertically disposed half-round bar affixed to flange 12. This abutment engages a tooth 16 of the gear during the terminal portion of its travel, and rotates it to the angular position shown in full lines in FIG. 1 where it is engageable by the loader mechanism, including jaws 7—7.

To prevent excessive overtravel of the gear due to its momentum, another abutment, designated 17, is provided for contact with a tooth 18 of the gear that is remote from the tooth 16 engaged with abutment 15. Preferably the abutment 17 is so positioned as to engage a tooth 18 that is substantially opposite, diametrically, to the tooth 16. The abutment 17 may, as shown, consist of a rod adjustably secured by a set-screw 19 in a bore in a bracket 21 affixed to flange 13. The abutment 17 is preferably so adjusted as to allow a slight amount of overtravel of the gear beyond the position of the gear G when gripped by jaws 7, to allow for slight adjustment or realignment of the gear in the loader mechanism as the jaws close.

As disclosed in aforementioned application Ser. No. 356,711 the conveyor may be advanced stepwise by an actuator of the type shown schematically in FIG. 3. This actuator comprises an hydraulic cylinder 22 fixed with respect to the housing, 8, 11, 12, a piston 23 reciprocable in the cylinder, and a pawl 24 pivoted to a member 25 on the rod of the piston. On each forward stroke of the piston, to the left in FIG. 3, the pawl advances from the broken line position to the full line position and, in doing so, engages a carrier 5 and advances it by one pitch, thereby bringing the gear on the adjacent carrier (at the extreme left in FIG. 3) into the loading position. In this position, which is the position of the gear G shown in full lines in FIG. 1, the gear is substantially aligned vertically with the loader mechanism represented by jaws 7. On each return stroke of the piston the pawl ratchets over the following carrier 5 to a position therebehind, as shown in broken lines in FIG. 3. To enable this ratchet action a light spring, not shown, is provided on member 25 to urge the pawl against a shoulder 26 on member 25. The actuator is preferably so positioned that at the conclusion of a forward stroke of the piston the pintle 6 in loading position is very slightly short of true-vertical alignment with the loader mechanism, to allow for slight adjustment or realignment of the workpiece as the jaws 7 close.

Having now described the preferred embodiment of our invention, what we claim is:

1. A gear orienting device for a stepwise-advancing gear conveyor, especially a conveyor having a carrier which supports a gear loosely, in a manner to allow it limited radial motion and rotary motion, having a fixed guide surface substantially parallel to the path of advance of the carrier and guidingly engageable by tips of the gear teeth, a spring guide surface also substantially parallel to the path of advance of the carrier and guidingly engageable with the tips of gear teeth substantially opposite, diametrically, to the teeth engaging said fixed guide surface, for pressing the gear against said fixed guide surface as the carrier draws the gear between said guide surfaces, and an abutment for engaging a gear being thus drawn between said guide surfaces, said abutment being so positioned adjacent said fixed guide surface as to be engageable by a gear tooth in contact with said fixed guide surface during a terminal phase of a step of advance of the carrier, to rotate the gear on the carrier.

2. A device according to claim 1 in which there is a second abutment stationary with respect to the fixed guide surface, said second abutment being engageable by a tooth of the gear that is remote from a tooth that is at the same time engaged with the first-mentioned abutment, said abutments being so arranged that by simultaneous engagement with the gear they positively limit both rotation and advance of the gear.

3. A device according to claim 2 in which said second abutment is positioned for engagement by a tooth of the gear which is substantially opposite, diametrically, to the tooth engageable with the first-mentioned abutment.

4. A device according to claim 2 in which the conveyor comprises a plurality of such carriers, to successively bring gears into engagement with said first-mentioned abutment upon successive steps of advance of the conveyor.

References Cited by the Examiner

UNITED STATES PATENTS

| 1,823,574 | 9/1931 | Rowe | 198—33.2 |
| 1,891,195 | 12/1932 | Titus | 198—33.2 X |
| 2,376,161 | 5/1945 | Maud et al. | |
| 2,667,959 | 2/1954 | Rogers | 198—33.2 |
| 2,843,252 | 7/1958 | Eddison et al. | 198—33.2 |
| 3,109,530 | 11/1963 | McPherson | 198—33.2 |

References Cited by the Applicant

UNITED STATES PATENTS

| 2,589,475 | 3/1952 | Carlsen et al. |
| 2,773,426 | 12/1956 | Fowler et al. |

FOREIGN PATENTS

| 962,078 | 6/1964 | Great Britain. |

DAVID J. WILLIAMOWSKY, *Primary Examiner.*

C. J. HUSAR, *Assistant Examiner.*